United States Patent
Phillips

(10) Patent No.: US 9,003,906 B2
(45) Date of Patent: Apr. 14, 2015

(54) ELEVEN SPEED DUAL CLUTCH TRANSMISSION

(71) Applicant: GM Global Technology Operations LLC, Detroit, MI (US)

(72) Inventor: Andrew W. Phillips, Rochester, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/183,136

(22) Filed: Feb. 18, 2014

(65) Prior Publication Data
US 2014/0260738 A1 Sep. 18, 2014

Related U.S. Application Data

(60) Provisional application No. 61/793,495, filed on Mar. 15, 2013.

(51) Int. Cl.
| | | |
|---|---|---|
| F16H 3/08 | (2006.01) | |
| F16H 3/38 | (2006.01) | |
| F16H 3/00 | (2006.01) | |
| F16H 3/093 | (2006.01) | |

(52) U.S. Cl.
CPC ........ *F16H 3/006* (2013.01); *F16H 2003/0931* (2013.01); *F16H 2003/0933* (2013.01); *F16H 2200/0073* (2013.01)

(58) Field of Classification Search
CPC ............... F16H 3/093; F16H 37/0833; F16H 2003/0931; F16H 2200/0073
USPC ..................... 74/330, 331, 333, 340
See application file for complete search history.

(56) References Cited

U.S. PATENT DOCUMENTS

| | | | |
|---|---|---|---|
| 7,597,020 B2 * | 10/2009 | Baldwin ..................... | 74/336 R |
| 8,038,564 B2 * | 10/2011 | Earhart et al. ............... | 475/218 |
| 8,333,127 B2 * | 12/2012 | Singh et al. ..................... | 74/330 |
| 2006/0207365 A1 * | 9/2006 | Baldwin ......................... | 74/340 |
| 2008/0196543 A1 * | 8/2008 | Kobayashi et al. ............. | 74/664 |
| 2008/0245166 A1 * | 10/2008 | Baldwin ......................... | 74/331 |
| 2009/0036247 A1 * | 2/2009 | Earhart et al. .................. | 475/35 |

\* cited by examiner

*Primary Examiner* — William Kelleher
*Assistant Examiner* — Jake Cook

(57) ABSTRACT

A transmission is connectable to an input member and includes an output transfer gear, first and second shaft members, first and second countershaft members, a plurality of co-planar gear sets, and a plurality of torque transmitting devices. The torque transmitting devices include a plurality of gears, synchronizer assemblies and a dual clutch assembly. The transmission is operable to provide at least one reverse speed ratio and a plurality of forward speed ratios between the input member and the output member.

20 Claims, 1 Drawing Sheet

| GEAR STATE | GEAR RATIO | RATIO STEP | TORQUE TRANSMITTING ELEMENTS ||||||||||
|---|---|---|---|---|---|---|---|---|---|---|---|---|
| | | | 38 | 36 | 154B | 158 | 154A | 152B | 156 | 150A | 152A | 150B |
| REV | -17.739 | | X | | X | X | | | | X | | |
| N | | -1.00 | | | | | | | | | | |
| 1ST | 17.707 | | | X | | X | X | | | X | | |
| 2ND | 14.214 | 1.25 | X | | | O | X | | | X | | |
| 3RD | 11.415 | 1.25 | | X | | O | | X | | X | | |
| 4TH | 9.169 | 1.24 | | X | | X | | | X | X | | |
| 5TH | 7.361 | 1.25 | X | | | O | | | X | X | | |
| 6TH | 5.926 | 1.24 | | X | | O | O | | | | X | |
| 7TH | 4.752 | 1.25 | | X | | X | X | | | | | X |
| 8TH | 3.814 | 1.25 | X | | | O | X | | | | | X |
| 9TH | 3.063 | 1.25 | | X | | O | | X | | | | X |
| 10TH | 2.461 | 1.24 | | X | | X | | | X | | | X |
| 11TH | 1.975 | 1.25 | X | | | O | | | X | | | X |

X = ON - ENGAGED CARRYING TORQUE
O = ON - ENGAGED NOT CARRYING TORQUE

US 9,003,906 B2

ELEVEN SPEED DUAL CLUTCH TRANSMISSION

CROSS-REFERENCE TO RELATED APPLICATIONS

This application claims the benefit of U.S. Provisional Application No. 61/793,495, filed on Mar. 15, 2013, which is herein incorporated by reference in its entirety.

TECHNICAL FIELD

The present disclosure relates to transmissions and more particularly to a compact, dual clutch multiple speed transmission having at least two countershafts to establish eleven or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission connectable to an input member and includes an output member, first and second transmission input shaft members, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

In another aspect of the present invention, the selective engagement of the first and second clutches of the dual clutch assembly interconnects the dual clutch housing with at least one of the first and the second transmission input members and the selective engagement of at least one of the five synchronizer assemblies establishes at least one of eleven forward speed ratios.

The above features and advantages and other features and advantages of the present invention are readily apparent from the following detailed description of the best modes for carrying out the invention when taken in connection with the accompanying drawings wherein like reference numbers refer to the same component, element or feature.

DESCRIPTION

Figures 1, 2:
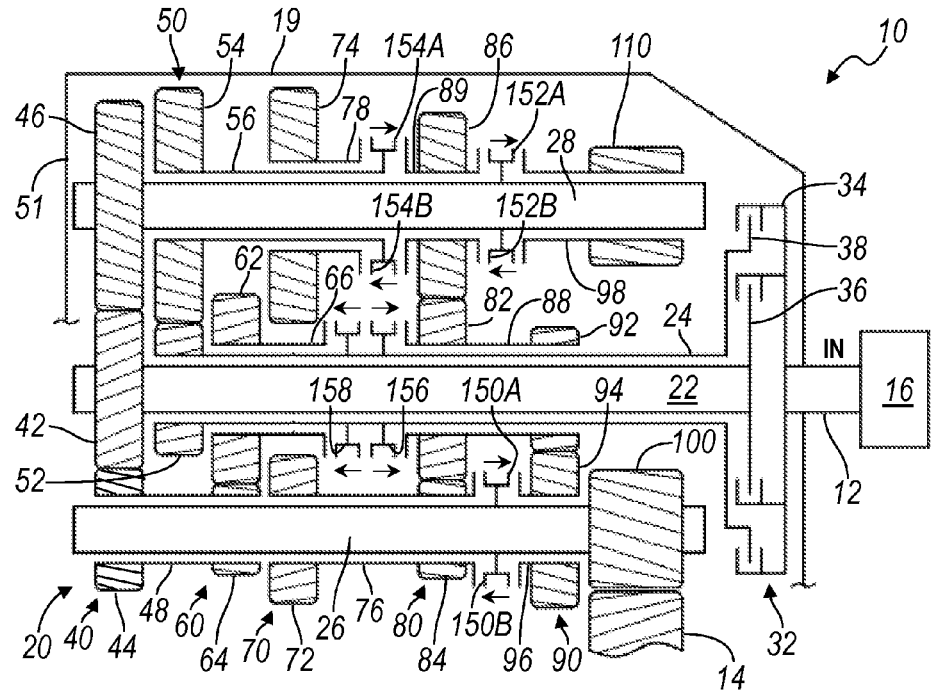
FIG. 1 is a schematic view of an embodiment of an eleven speed transmission having a dual clutch, two transmission input shafts, a plurality of gear sets and a plurality of synchronizers, in accordance with the present invention.
FIG. 2 is a clutch table illustrating the state of engagement of the dual clutch and each of the plurality of synchronizers for each of the eleven forward gear ratios and one reverse gear ratio, in accordance with the present invention.

Referring to FIG. 1, a multiple speed transmission is generally indicated by reference number 10. The transmission 10 is connectable to an input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine 16 or other torque producing machine to provide a driving torque to input member 12. The output member or gear 14 rotatably drives a differential assembly (not shown). The differential assembly transfers torque delivered by output member 14, ultimately, to road wheels (not shown).

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26, and a second countershaft 28. The second transmission input shaft or member 24 is a hollow shaft that is concentric with and overlies the first transmission input shaft or member 22. The first countershaft 26 and the second countershaft 28 are each spaced apart from and parallel with the first and second transmission input shaft members 22, 24. The first and second transmission input shafts 22, 24 define a first axis of rotation, the first countershaft 26 defines a second axis of rotation and the second countershaft 28 defines a third axis of rotation. The position and location of countershafts 26 and relative to first and second transmission input shafts 22, 24 are interchangeable.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24. It should be appreciated that the dual clutch assembly 32 shown throughout the Figures may be a wet or dry clutch assembly without departing from the scope of the present invention.

The gearing arrangement 20 also includes a plurality of co-planar, meshing gear sets 40, 50, 60, 70, 80 and 90. The present invention contemplates that the plurality of co-planar, meshing gear sets 40, 50, 60, 70, 80 and 90 may be arranged axially along transmission input shafts 22, 24 in an order other than that which is shown in FIG. 1 and still be within the scope of the invention. Co-planar gear set 40 includes first pinion gear 42, second pinion gear 44 and third pinion gear 46. First pinion gear 42 is rotatably fixed and connected for common rotation with the first transmission input shaft member 22. Second pinion gear 44 is rotatably fixed and connected for common rotation with a first sleeve shaft 48 and meshes with first pinion gear 42. Third pinion gear 46 is fixed and connected for common rotation with the second countershaft member 28 and meshes with first pinion gear 42. It should be appreciated that first pinion gear 42 may be a separate gear structure fixed to the first transmission input shaft member 22 or gear teeth/splines formed on an outer surface of the first transmission input shaft member 22 without departing from the scope of the present invention. Gear set 40 is disposed adjacent a wall 51 of the transmission housing 19 on the opposite side of the transmission relative to the dual clutch assembly 32.

Co-planar gear set 50 includes a first pinion gear 52 and a second pinion gear 54. First pinion gear 52 is rotatably fixed and connected for common rotation with the second transmission input shaft member 24 and meshes with second pinion gear 54. Second pinion gear 54 is rotatably fixed and connected for common rotation with a second sleeve shaft 56. Gear set 50 is positioned axially adjacent gear set 40.

Co-planar gear set 60 includes a first pinion gear 62 and a second pinion gear 64. First pinion gear 62 is rotatably fixed and connected for common rotation with a third sleeve shaft 66 and meshes with second pinion gear 64. Second pinion gear 64 is rotatably fixed and connected for common rotation with the first sleeve shaft 48. Gear set 60 is disposed adjacent gear set 50.

Co-planar gear set 70 includes first pinion gear 72 and second pinion gear 74. First pinion gear 72 is rotatably fixed and connected for common rotation with a fourth sleeve shaft 76 and meshes with second pinion gear 74. Second pinion gear 74 is fixed and connected for common rotation with a fifth sleeve shaft 78. Gear set 70 is positioned adjacent gear set 60.

Co-planar gear set 80 includes first pinion gear 82, second pinion gear 84 and third pinion gear 86. First pinion gear 82 is rotatably fixed and connected for common rotation with a sixth sleeve shaft 88 and meshes with second pinion gear 84 and with third pinion gear 86. Second pinion gear 84 is rotatably fixed and connected for common rotation with the fourth sleeve shaft member 76. Third pinion gear 86 is rotatably fixed and connected for common rotation with a seventh sleeve shaft 89. Gear set 80 is positioned adjacent gear set 70.

Co-planar gear set 90 includes first pinion gear 92 and second pinion gear 94. First pinion gear 92 is rotatably fixed and connected for common rotation with the sixth sleeve shaft 88 and meshes with second pinion gear 94. Second pinion gear 94 is rotatably fixed and connected for common rotation with an eighth sleeve shaft 96. Gear set 90 is positioned between gear set 80 and dual clutch 32.

Further, a first countershaft transfer gear 100 is rotatably fixed and connected for common rotation with the first countershaft member 26. A second countershaft transfer gear 110 is rotatably fixed and connected for common rotation with a ninth sleeve shaft 98. First countershaft transfer gear 100 is configured to mesh with output member 14 and the second countershaft transfer gear 110 is configured to mesh with output member 14. However, the first countershaft transfer gear 100 and the second countershaft transfer gear 110 do not mesh with each other.

A park gear (not shown) may be provided for placing transmission 10 in a park mode that prevents output member 14 from rotating. The park gear may be rotationally fixed to the first countershaft member 26 or to the second countershaft member 28. However, the axial location of the park gear along the first or second countershaft members 26, 28 may be changed in accordance with available packaging space.

With continued reference to FIG. 1, the transmission 10 further includes a plurality of selectively engageable synchronizer assemblies 150, 152, 154, 156 and 158. Synchronizers 150A-B, 152A-B and 154A-B are double sided synchronizers and generally include a shift fork (not shown) that is bi-directionally translated by an actuator (not shown) into at least two engaged positions and a neutral or disengaged position. In the present embodiment, synchronizer 150A is selectively actuatable to connect the eighth sleeve shaft 96 for common rotation with the first countershaft member 26 and synchronizer 150B is selectively actuatable to connect the fourth sleeve shaft 76 for common rotation with the first countershaft member 26. Synchronizer 152A is selectively actuatable to connect for common rotation the ninth sleeve shaft 98 with the second countershaft member 28 and synchronizer 152B is selectively actuatable to connect for common rotation the seventh sleeve shaft 89 with the second countershaft member 28. Synchronizer 154A is selectively actuatable to connect for common rotation the seventh sleeve shaft 89 with the second sleeve shaft 56 and synchronizer 154B is selectively actuatable to connect for common rotation the fifth sleeve shaft 78 with the second sleeve shaft 56. Synchronizers 156 and 158 are single sided synchronizers and generally include a shift fork (not shown) that is bi-directionally translated by an actuator (not shown) into at least one engaged position and a neutral or disengaged position. Synchronizer 156 is selectively actuatable to connect for common rotation the sixth sleeve shaft 88 with the second transmission input shaft member 24. Synchronizer 158 is selectively actuatable to connect for common rotation the third sleeve shaft 66 with the second transmission input shaft member 24.

The transmission 10 is capable of transmitting torque from the input shaft 12 to the output gear member 14 in at least eleven forward torque ratios and at least one reverse torque ratio. Each of the forward torque ratios and the reverse torque ratio is attained by selective engagement of the dual clutch assembly 32 and one or more of the synchronizer assemblies 150, 152, 154, 156 and 158. Those skilled in the art will readily understand that a different speed ratio is associated with each torque ratio.

It should be appreciated that each individual gear set or combinations of gear sets 40, 50, 60, 70, 80 and 90 provides one or more forward and/or reverse gear ratios upon selective engagement of the synchronizer assemblies 150, 152, 154, 156 and 158. It should also be appreciated that a particular forward or reverse speed ratio may be achieved by different combinations of synchronizer and associated gear sets without departing from the scope of the present invention.

Referring now to FIG. 2, a truth table or clutching chart illustrates the state of engagement for the dual clutch 32 and the synchronizers 150, 152, 154, 156 and 158. An "X" in the box means that the particular clutch or synchronizer is engaged to achieve the desired gear state and an "0" means that the clutch or synchronizer is activated or "on" but not carrying torque. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example, to establish the reverse torque ratio, clutch element 38 is engaged and synchronizers 154B, 158 and 150A are activated. Clutch element 38 couples the input member 12 with the second transmission input shaft member 24. Synchronizer 154B connects sleeve shaft 56 to the sleeve shaft 78. Synchronizer 158 connects sleeve shaft 66 to the second transmission input shaft member 24. Synchronizer 150A connects sleeve shaft 96 to the first countershaft member 26. More specifically, input torque from the input shaft 12 is transferred through the dual clutch assembly 32 to the second transmission input shaft member 24, from transmission input shaft member 24 to synchronizer 158, from synchronizer 158 to sleeve shaft 66 and gear 62, from gear 62 to gear 64, through sleeve shaft 48 to gear 44, from gear 44 to gear 42 to gear 46, from gear 46 to second countershaft member 28, from second countershaft member 28 and from the second transmission input shaft member 24 to gear 52, from gear 52 to gear 54, from gear 54 to sleeve shaft 56, from sleeve shaft 56 to synchronizer 154B, from synchronizer 154B to sleeve shaft 78 and gear 74, from gear 74 to gear 72, from gear 72 to sleeve shaft 76, from sleeve shaft 76 to synchronizer 150A and to the first countershaft member 26, then to first countershaft transfer gear 100 and from first countershaft transfer gear 100 to the output member 14.

To establish a first forward torque ratio (i.e. a 1st gear), clutch element 36 is engaged and synchronizers 158, 154A and 150A are activated. Clutch element 36 couples the input member 12 with the first transmission input shaft member 22. Synchronizer 158 connects the second transmission input shaft member 24 to sleeve shaft 66. Synchronizer 154A connects sleeve shaft 56 to the sleeve shaft 89. Synchronizer 150A connects sleeve shaft 96 to the first countershaft member 26. More specifically, input torque from the input shaft 12 is transferred through the dual clutch assembly 32 to gear 42, from gear 42 to gear 44, from gear 44 to sleeve shaft 48, from sleeve shaft 48 to gear 64, from gear 64 to gear 62, from gear 62 to sleeve shaft 66, from sleeve shaft 66 to synchronizer 158, from synchronizer 158 to the second transmission input shaft member 24 to gear 52, from gear 52 to gear 54, from gear 54 to sleeve shaft 56, from sleeve shaft 56 to synchronizer 154A, from synchronizer 154A to the sleeve shaft member 89 and gear 86, from gear 86 to gear 82, from gear 82 to sleeve shaft 88 and gear 92, from gear 92 to gear 94, from gear 94 to synchronizer 150A, from synchronizer 150A to the first countershaft member 26, then to first countershaft transfer gear 100 and from first countershaft transfer gear 100 to the output member 14.

To establish a second forward torque ratio (i.e. a 2nd gear), clutch element 38 is engaged and synchronizers 154A and 150A are activated. Clutch element 38 couples the input member 12 with the second transmission input shaft member 24. Synchronizer 154A connects sleeve shaft 56 to the sleeve shaft 89. Synchronizer 150A connects sleeve shaft 96 to the first countershaft member 26. More specifically, input torque from the input shaft 12 is transferred through the dual clutch assembly 32 to the second transmission input shaft member 24 to gear 52, from gear 52 to gear 54, from gear 54 to sleeve shaft 56, from sleeve shaft 56 to synchronizer 154A, from synchronizer 154A to the sleeve shaft member 89 and gear 86, from gear 86 to gear 82, from gear 82 to sleeve shaft 88 and gear 92, from gear 92 to gear 94, from gear 94 to synchronizer 150A, from synchronizer 150A to the first countershaft member 26, then to first countershaft transfer gear 100 and from first countershaft transfer gear 100 to the output member 14.

To establish a third forward torque ratio (i.e. a 3rd gear), clutch element 36 is engaged and synchronizers 152B and 150A are activated. Clutch element 36 couples the input member 12 to the first transmission input shaft member 22 which rotates pinion 42. Synchronizer 152B connects sleeve shaft 89 to the second countershaft member 28. Synchronizer 150A connects sleeve shaft 96 to the first countershaft member 26. More specifically, input torque from the input shaft 12 is transferred through the dual clutch assembly 32 to the first transmission input shaft member 22 to gear 42, from gear 42 to gear 46, from gear 46 to synchronizer 152B, from synchronizer 152B to sleeve shaft 89 and gear 86, from gear 86 to gear 82, from gear 82 to sleeve shaft 88 and gear 92, from gear 92 to gear 94, from gear 94 to synchronizer 150A, from synchronizer 150A to the first countershaft member 26, then to first countershaft transfer gear 100 and from first countershaft transfer gear 100 to the output member 14.

To establish a fourth forward torque ratio (i.e. a 4th gear), clutch element 36 is engaged and synchronizers 158, 156 and 150A are activated. Clutch element 36 couples the input member 12 with the first transmission input shaft member 22. Synchronizer 158 connects the second transmission input shaft member 24 to sleeve shaft 66. Synchronizer 156 connects the second transmission input shaft member 24 to sleeve shaft 88. Synchronizer 150A connects sleeve shaft 96 to the first countershaft member 26. More specifically, input torque from the input shaft 12 is transferred through the dual clutch assembly 32 to the first transmission input shaft member 22 to gear 42, from gear 42 to gear 44, from gear 44 to sleeve shaft 48, from sleeve shaft 48 to gear 64, from gear 64 to gear 62, from gear 62 to sleeve shaft 66, from sleeve shaft 66 to synchronizer 158, from synchronizer 158 to the second transmission input shaft member 24, from the second transmission input shaft member 24 to synchronizer 156, from synchronizer 156 to the sleeve shaft member 88 and gear 92, from gear 92 to gear 94, from gear 94 to synchronizer 150A, from synchronizer 150A to the first countershaft member 26, then to first countershaft transfer gear 100 and from first countershaft transfer gear 100 to the output member 14.

To establish a fifth forward torque ratio (i.e. a 5th gear), clutch element 38 is engaged and synchronizers 156 and 150A are activated. Clutch element 38 couples the input member 12 with the second transmission input shaft member 24. Synchronizer 156 connects the second transmission input shaft member 24 to sleeve shaft 88. Synchronizer 150A connects sleeve shaft 96 to the first countershaft member 26. More specifically, input torque from the input shaft 12 is transferred through the dual clutch assembly 32 to the second transmission input shaft member 24 to synchronizer 156, from synchronizer 156 to the sleeve shaft member 88 and gear 92, from gear 92 to gear 94, from gear 94 to synchronizer 150A, from synchronizer 150A to the first countershaft member 26, then to first countershaft transfer gear 100 and from first countershaft transfer gear 100 to the output member 14.

To establish a sixth forward torque ratio (i.e. a 6th gear), clutch element 36 is engaged and synchronizer 152A are activated. Clutch element 36 couples the input member 12 with the first transmission input shaft member 22. Synchronizer 152A connects the second countershaft member 28 to sleeve shaft 98. More specifically, input torque from the input shaft 12 is transferred through the dual clutch assembly 32 to the first transmission input shaft member 22 to synchronizer 152A, from synchronizer 152A to the sleeve shaft member 98 and transfer gear 110, from transfer gear 110 to the output member 14.

To establish a seventh forward torque ratio (i.e. a 7th gear), clutch element 36 is engaged and synchronizers 158, 154A and 150B are activated. Clutch element 36 couples the input member 12 with the first transmission input shaft member 22. Synchronizer 158 connects the second transmission input shaft member 24 to sleeve shaft 66. Synchronizer 154A connects sleeve shaft 56 to the sleeve shaft 89. Synchronizer 150B connects sleeve shaft 76 to the first countershaft member 26. More specifically, input torque from the input shaft 12 is transferred through the dual clutch assembly 32 to the first transmission input shaft member 22 and to gear 42, from gear 42 to gear 44, from gear 44 to sleeve shaft 48 to gear 64, from gear 64 to gear 62, from gear 62 to sleeve shaft 66, from sleeve shaft 66 to synchronizer 158, from synchronizer 158 to the second transmission input shaft member 24 to gear 52, from gear 52 to gear 54, from gear 54 to sleeve shaft 56, from sleeve shaft 56 to synchronizer 154A, from synchronizer 154A to the sleeve shaft member 89 and gear 86, from gear 86 to gear 82, from gear 82 to gear 84, from gear 84 to sleeve shaft 76, from sleeve shaft 76 to synchronizer 150B, from synchronizer 150B to the first countershaft member 26, then to first countershaft transfer gear 100 and from first countershaft transfer gear 100 to the output member 14.

To establish an eighth forward torque ratio (i.e. an 8th gear), clutch element 38 is engaged and synchronizers 154A and 150B are activated. Clutch element 38 couples the input member 12 with the second transmission input shaft member 24. Synchronizer 154A connects sleeve shaft 56 to the sleeve shaft 89. Synchronizer 150B connects sleeve shaft 76 to the first countershaft member 26. More specifically, input torque from the input shaft 12 is transferred through the dual clutch assembly 32 to the second transmission input shaft member 24 to gear 52, from gear 52 to gear 54, from gear 54 to sleeve shaft 56, from sleeve shaft 56 to synchronizer 154A, from synchronizer 154A to the sleeve shaft member 89 and gear 86, from gear 86 to gear 82, from gear 82 to gear 84, from gear 84 to sleeve shaft 76, from sleeve shaft 76 to synchronizer 150B, from synchronizer 150B to the first countershaft member 26, then to first countershaft transfer gear 100 and from first countershaft transfer gear 100 to the output member 14.

To establish a ninth forward torque ratio (i.e. a 9th gear), clutch element 36 is engaged and synchronizers 152B and 150B are activated. Clutch element 36 couples the input member 12 with the first transmission input shaft member 22. Synchronizer 152B connects sleeve shaft 89 to second countershaft member 28. Synchronizer 150B connects sleeve shaft 76 to the first countershaft member 26. More specifically, input torque from the input shaft 12 is transferred through the dual clutch assembly 32 to the first transmission input shaft member 22 to gear 42, from gear 42 to gear 46, from gear 46 to second countershaft member 28, from second countershaft member 28 to synchronizer 152B, from synchronizer 152B to the sleeve shaft 89 and gear 86, from gear 86 to gear 82, from gear 82 to gear 84, from gear 84 to sleeve shaft 76, from sleeve shaft 76 to synchronizer 150B, from synchronizer 150B to the first countershaft member 26, then to first countershaft transfer gear 100 and from first countershaft transfer gear 100 to the output member 14.

To establish a tenth forward torque ratio (i.e. a 10th gear), clutch element 36 is engaged and synchronizers 158, 156 and 150B are activated. Clutch element 36 couples the input member 12 with the first transmission input shaft member 22. Synchronizer 158 connects the second transmission input shaft member 24 to sleeve shaft 66. Synchronizer 156 connects the second transmission input shaft member 24 to sleeve shaft 88. Synchronizer 150B connects sleeve shaft 76 to the first countershaft member 26. More specifically, input torque from the input shaft 12 is transferred through the dual clutch assembly 32 to the first transmission input shaft member 22 to gear 42, from gear 42 to gear 44, from gear 44 to sleeve shaft 48, from sleeve shaft 48 to gear 64, from gear 64 to gear 62, from gear 62 to sleeve shaft 66, from sleeve shaft 66 to synchronizer 158, from synchronizer 158 to the second transmission input shaft member 24, from the second transmission input shaft member 24 to synchronizer 156, from synchronizer 156 to the sleeve shaft 88 and gear 82, from gear 82 to gear 84, from gear 84 to synchronizer 150B, from synchronizer 150B to the first countershaft member 26, then to first countershaft transfer gear 100 and from first countershaft transfer gear 100 to the output member 14.

To establish an eleventh forward torque ratio (i.e. an 11th gear), clutch element 38 is engaged and synchronizers 156 and 150B are activated. Clutch element 38 couples the input member 12 with the second transmission input shaft member 24. Synchronizer 156 connects the second transmission input shaft member 24 to sleeve shaft 88. Synchronizer 150B connects sleeve shaft 76 to the first countershaft member 26. More specifically, input torque from the input shaft 12 is transferred through the dual clutch assembly 32 to the second transmission input shaft member 24 to synchronizer 156, from synchronizer 156 to the sleeve shaft 88 and gear 82, from gear 82 to gear 84, from gear 84 to synchronizer 150B, from synchronizer 150B to the first countershaft member 26, then to first countershaft transfer gear 100 and from first countershaft transfer gear 100 to the output member 14.

Again, it should be appreciated that any one of the gear sets of gear sets 40, 50, 60, 70, 80 and 90 may be changed in size and number gear teeth or gear pitch to produce a certain forward and reverse torque ratio without departing from the scope of the present invention.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example in other embodiments of the present invention, the overall length of the transmission may be reduced by relocating synchronizer 156 and 158. More specifically, synchronizer 156 may be relocated to the opposite end of sleeve shaft 88 proximate to the dual clutch assembly 32. Synchronizer 158 may also be relocated between gear sets 40 and 60 to conserve packaging space.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
a transmission housing;
a dual clutch assembly having a first clutch, second clutch and a clutch housing connectable to an engine output member, wherein the clutch housing is rotationally supported within the transmission housing;
a first, second, third, fourth, fifth and sixth gear set, wherein the first gear set includes a first gear in mesh with a second gear and a third gear, the second gear set includes a first gear in mesh with a second gear, the third gear set includes a first gear in mesh with a second gear, the fourth gear set includes a first gear in mesh with a second gear, the fifth gear set includes a first gear in mesh with a second gear and a third gear and the sixth gear set includes a first gear in mesh with a second gear;

a first transmission input member rotatably supported in the transmission housing and wherein the first gear of the first gear set is rotatably fixed for common rotation with the first transmission input member and wherein the selective engagement of the first clutch of the dual clutch assembly transfers torque from the clutch housing to the first transmission input member;

a second transmission input member rotatably supported in the transmission housing and wherein the first gear of the first second gear set is rotatably fixed for common rotation with the second transmission input member and wherein the second transmission input member is concentric with the first transmission input member and at least partially surrounds the first transmission input member and wherein the selective engagement of the second clutch of the dual clutch assembly transfers torque form the clutch housing to the second transmission input member;

a first countershaft rotatably supported within the transmission housing and spaced apart from and parallel with the first and second transmission input members, wherein the second gear of the first gear set and the second gear of the third gear set are rotatably supported by the first countershaft and the first gear of the fourth gear set, the second gear of the fifth gear set and the second gear of the sixth gear set are each selectively connectable for common rotation with the first countershaft;

a second countershaft rotatably supported within the transmission housing and spaced apart from and parallel with the first and second transmission input members, wherein the third gear of the first gear set is fixed for common rotation with the second coutershaft, the second gear of the second gear set, the second gear of the fourth gear set, and the third gear of the fifth gear set are each selectively connectable for common rotation with the second countershaft;

a first countershaft transfer gear fixed to the first countershaft for common rotation with the first countershaft;

a second countershaft transfer gear wherein the first and second countershaft transfer gears transfer torque to a transmission output member;

a first sleeve shaft rotatably supported in the transmission housing and at least partially surrounds the first countershaft and wherein the second gear of the first gear set and the second gear of the third gear set are rotatably fixed for common rotation with the first sleeve shaft;

a second sleeve shaft rotatably supported in the transmission housing and at least partially surrounds the second countershaft and wherein the second gear of the second gear set is rotatably fixed for common rotation with the second sleeve shaft;

a third sleeve shaft rotatably supported in the transmission housing and at least partially surrounds the second transmission input member and wherein the first gear of the third gear set is rotatably fixed for common rotation with the third sleeve shaft;

a fourth sleeve shaft rotatably supported in the transmission housing and at least partially surrounds the first countershaft and wherein the first gear of the fourth gear set and the second gear of the fifth gear set are rotatably fixed for common rotation with the fourth sleeve shaft;

a fifth sleeve shaft rotatably supported in the transmission housing and at least partially surrounds the second countershaft and wherein the second gear of the fourth gear set is rotatably fixed for common rotation with the fifth sleeve shaft;

a sixth sleeve shaft rotatably supported in the transmission housing and at least partially surrounds the second transmission input member and wherein the first gear of the fifth gear set and the first gear of the sixth gear set is rotatably fixed for common rotation with the sixth sleeve shaft;

a seventh sleeve shaft rotatably supported in the transmission housing and at least partially surrounds the second countershaft and wherein the third gear of the fifth gear set is rotatably fixed for common rotation with the seventh sleeve shaft;

an eighth sleeve shaft rotatably supported in the transmission housing and at least partially surrounds the first countershaft and wherein the second gear of the sixth gear set is rotatably fixed for common rotation with the eighth sleeve shaft;

a ninth sleeve shaft rotatably supported in the transmission housing and at least partially surrounds the second countershaft and wherein the second countershaft transfer gear is rotatably fixed for common rotation with the ninth sleeve shaft; and five synchronizer assemblies for selectively coupling at least one of the sleeve shafts with at least one of the first and second transmission input members, and the first and second countershafts, and wherein the selective engagement of the first and second clutches of the dual clutch assembly interconnects the dual clutch housing with at least one of the first and the second transmission input members and the selective engagement of at least one of the five synchronizer assemblies establishes at least one of a plurality of forward and reverse speed ratios.

2. The transmission of claim 1 wherein a first of the five synchronizer assemblies selectively connects at least one of the fourth sleeve shaft and the eighth sleeve shaft to the first countershaft.

3. The transmission of claim 2 wherein a second of the five synchronizer assemblies selectively connects at least one of the seventh sleeve shaft and the ninth sleeve shaft to the second countershaft.

4. The transmission of claim 3 wherein a third of the five synchronizer assemblies selectively connects at least one of the fifth sleeve shaft and the seventh sleeve shaft to the second countershaft.

5. The transmission of claim 4 wherein a fourth of the five synchronizer assemblies selectively connects the sixth sleeve shaft to the second transmission input member.

6. The transmission of claim 5 wherein a fifth of the five synchronizer assemblies selectively connects the third sleeve shaft to the second transmission input member.

7. The transmission of claim 1 wherein the sixth gear set is adjacent the dual clutch assembly, the fifth gear set is adjacent the sixth gear set, the fourth gear set is adjacent the fifth gear set, the third gear set is adjacent the fourth gear set, the second gear set is adjacent the third gear set and the first gear set is disposed between the second gear set and an end wall of the transmission housing.

8. The transmission of claim 1 wherein the five synchronizer assemblies includes a first synchronizer assembly for selectively connecting the third sleeve shaft to the first transmission input member, a third synchronizer assembly for selectively connecting the second sleeve shaft to the seventh sleeve shaft, and a fifth synchronizer assembly for selectively connecting the third sleeve shaft to the first transmission input member to establish a first gear ratio when the second clutch of the dual clutch is engaged to connect the dual clutch housing to the second transmission input member.

9. The transmission of claim 1 wherein the five synchronizer assemblies includes a first synchronizer assembly for selectively connecting the eighth sleeve shaft to the first countershaft and a third synchronizer assembly for selectively connecting the second sleeve shaft to the seventh sleeve shaft to establish a second gear ratio when the second clutch of the dual clutch is engaged to connect the dual clutch housing to the second transmission input member.

10. The transmission of claim 1 wherein the five synchronizer assemblies includes a first synchronizer assembly for selectively connecting the eighth sleeve shaft to the first countershaft and a second synchronizer assembly for selectively connecting the second countershaft to the seventh sleeve shaft to establish a third gear ratio when the first clutch of the dual clutch is engaged to connect the dual clutch housing to the first transmission input member.

11. The transmission of claim 1 wherein the five synchronizer assemblies includes a first synchronizer assembly for selectively connecting the eighth sleeve shaft to the first countershaft, a fourth synchronizer assembly for selectively connecting the second countershaft to the sixth sleeve shaft and a fifth synchronizer assembly for selectively connecting the second countershaft to the third sleeve shaft to establish a fourth gear ratio when the first clutch of the dual clutch is engaged to connect the dual clutch housing to the first transmission input member.

12. The transmission of claim 1 wherein the five synchronizer assemblies includes a first synchronizer assembly for selectively connecting the eighth sleeve shaft to the first countershaft and a fourth synchronizer assembly for selectively connecting the second countershaft to the sixth sleeve shaft to establish a fifth gear ratio when the first clutch of the dual clutch is engaged to connect the dual clutch housing to the first transmission input member.

13. The transmission of claim 1 wherein the five synchronizer assemblies includes a second synchronizer assembly for selectively connecting the second countershaft to the ninth sleeve shaft to establish a sixth gear ratio when the first clutch of the dual clutch is engaged to connect the dual clutch housing to the first transmission input member.

14. The transmission of claim 1 wherein the five synchronizer assemblies includes a first synchronizer assembly for selectively connecting the fourth sleeve shaft to the first countershaft, a third synchronizer assembly for selectively connecting the second sleeve shaft to the seventh sleeve shaft and a fifth synchronizer assembly for selectively connecting the second transmission input member to the third sleeve shaft to establish a seventh gear ratio when the first clutch of the dual clutch is engaged to connect the dual clutch housing to the first transmission input member.

15. The transmission of claim 1 wherein the five synchronizer assemblies includes a first synchronizer assembly for selectively connecting the fourth sleeve shaft to the first countershaft and a third synchronizer assembly for selectively connecting the second sleeve shaft to the seventh sleeve shaft to establish an eighth gear ratio when the second clutch of the dual clutch is engaged to connect the dual clutch housing to the second transmission input member.

16. The transmission of claim 1 wherein the five synchronizer assemblies includes a first synchronizer assembly for selectively connecting the fourth sleeve shaft to the first countershaft and a second synchronizer assembly for selectively connecting the second countershaft shaft to the seventh sleeve shaft to establish a ninth gear ratio when the first clutch of the dual clutch is engaged to connect the dual clutch housing to the first transmission input member.

17. The transmission of claim 1 wherein the five synchronizer assemblies includes a first synchronizer assembly for selectively connecting the fourth sleeve shaft to the first countershaft, a fourth synchronizer assembly for selectively connecting the sixth sleeve shaft to the second transmission input member and a fifth synchronizer assembly for selectively connecting the third sleeve shaft to second transmission input member to establish a tenth gear ratio when the first clutch of the dual clutch is engaged to connect the dual clutch housing to the first transmission input member.

18. The transmission of claim 1 wherein the five synchronizer assemblies includes a first synchronizer assembly for selectively connecting the fourth sleeve shaft to the first countershaft and a fourth synchronizer assembly for selectively connecting the sixth sleeve shaft to the second transmission input member to establish a eleventh gear ratio when the first clutch of the dual clutch is engaged to connect the dual clutch housing to the first transmission input member.

19. The transmission of claim 1 wherein the transmission output member is a gear that meshes with the each of the first and second countershaft transfer gears.

20. A transmission comprising:
a transmission housing;
a dual clutch assembly having a first clutch, second clutch, and a clutch housing connectable to an engine output member, wherein the clutch housing is rotationally supported within the transmission housing;
a first, second, third, fourth, fifth and sixth gear set, wherein the first gear set includes a first gear in mesh with a second gear and a third gear, the second gear set includes a first gear in mesh with a second gear, the third gear set includes a first gear in mesh with a second gear, the fourth gear set includes a first gear in mesh with a second gear, the fifth gear set includes a first gear in mesh with a second gear and a third gear and the sixth gear set includes a first gear in mesh with a second gear;
a first transmission input member rotatably supported in the transmission housing and wherein the first gear of the first gear set is rotatably fixed for common rotation with the first transmission input member and wherein the selective engagement of the first clutch of the dual clutch assembly transfers torque from the clutch housing to the first transmission input member;
a second transmission input member rotatably supported in the transmission housing and wherein the first gear of the first second gear set is rotatably fixed for common rotation with the second transmission input member and wherein the second transmission input member is concentric with the first transmission input member and at least partially surrounds the first transmission input member and wherein the selective engagement of the second clutch of the dual clutch assembly transfers torque form the clutch housing to the second transmission input member;
a first countershaft rotatably supported within the transmission housing and spaced apart from and parallel with the first and second transmission input members, wherein the second gear of the first gear set, the second gear of the third gear set, the second gear of the fifth gear set and the second gear of the sixth gear set are each selectively connectable for common rotation with the first countershaft;
a second countershaft rotatably supported within the transmission housing and spaced apart from and parallel with the first and second transmission input members, wherein the third gear of the first gear set is connected for common rotation with the second coutershaft, the second gear of the second gear set, the second gear of the fourth gear set, and the third gear of the fifth gear set are each selectively connectable for common rotation with the second countershaft;

a first countershaft transfer gear fixed to the first countershaft for common rotation with the first countershaft;

a second countershaft transfer gear wherein the first and second countershaft transfer gears transfer torque from at least one of the first and second countershafts to a transmission output member;

a first sleeve shaft rotatably supported in the transmission housing and at least partially surrounds the first countershaft and wherein the second gear of the first gear set and the second gear of the third gear set are rotatably fixed for common rotation with the first sleeve shaft;

a second sleeve shaft rotatably supported in the transmission housing and at least partially surrounds the second countershaft and wherein the second gear of the second gear set is rotatably fixed for common rotation with the second sleeve shaft;

a third sleeve shaft rotatably supported in the transmission housing and at least partially surrounds the second transmission input member and wherein the first gear of the third gear set is rotatably fixed for common rotation with the third sleeve shaft;

a fourth sleeve shaft rotatably supported in the transmission housing and at least partially surrounds the first countershaft and wherein the first gear of the fourth gear set and the second gear of the fifth gear set are rotatably fixed for common rotation with the fourth sleeve shaft;

a fifth sleeve shaft rotatably supported in the transmission housing and at least partially surrounds the second countershaft and wherein the second gear of the fourth gear set is rotatably fixed for common rotation with the fifth sleeve shaft;

a sixth sleeve shaft rotatably supported in the transmission housing and at least partially surrounds the second transmission input member and wherein the first gear of the fifth gear set and the first gear of the sixth gear set is rotatably fixed for common rotation with the sixth sleeve shaft;

a seventh sleeve shaft rotatably supported in the transmission housing and at least partially surrounds the second countershaft and wherein the third gear of the fifth gear set is rotatably fixed for common rotation with the seventh sleeve shaft;

an eighth sleeve shaft rotatably supported in the transmission housing and at least partially surrounds the first countershaft and wherein the second gear of the sixth gear set is rotatably fixed for common rotation with the eighth sleeve shaft;

a ninth sleeve shaft rotatably supported in the transmission housing and at least partially surrounds the second countershaft and wherein the second countershaft transfer gear is rotatably fixed for common rotation with the ninth sleeve shaft;

a first synchronizer assembly selectively connects at least one of the fourth sleeve shaft and the eighth sleeve shaft to the first countershaft;

a second synchronizer assembly selectively connects at least one of the seventh sleeve shaft and the ninth sleeve shaft to the second countershaft;

a third synchronizer assembly selectively connects at least one of the fifth sleeve shaft and the seventh sleeve shaft to the second countershaft;

a fourth synchronizer assembly selectively connects the sixth sleeve shaft to the second transmission input member;

a fifth synchronizer assembly selectively connects the third sleeve shaft to the second transmission input member, and wherein the selective engagement of the first and second clutches of the dual clutch assembly and the selective engagement of at least one of the synchronizer assemblies establishes at least one of eleven forward speed ratios between the at least one of the first and the second transmission input members and the transmission output member.

* * * * *